US012591833B1

(12) United States Patent
Tiwari et al.

(10) Patent No.: US 12,591,833 B1
(45) Date of Patent: Mar. 31, 2026

(54) VIRTUAL PLANOGRAM AUTOMATION AND MODIFICATION

(71) Applicant: Blue Yonder Group, Inc., Scottsdale, AZ (US)

(72) Inventors: Mayank Tiwari, Telangana (IN); Ankit Belchandan, Chhattisgarh (IN); Bharani Sarvepalli, Hyderabad (IN); Santosh Kumar, Jharkhand (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 77 days.

(21) Appl. No.: 17/835,720

(22) Filed: Jun. 8, 2022

Related U.S. Application Data

(60) Provisional application No. 63/220,740, filed on Jul. 12, 2021, provisional application No. 63/214,965, (Continued)

(51) Int. Cl.
$G06Q\ 10/0637$ (2023.01)
$G06Q\ 10/0639$ (2023.01)
(Continued)

(52) U.S. Cl.
CPC . *G06Q 10/06375* (2013.01); *G06Q 10/06393* (2013.01); *G06Q 10/087* (2013.01); *G06V 20/36* (2022.01)

(58) Field of Classification Search
None
See application file for complete search history.

(56) References Cited

U.S. PATENT DOCUMENTS

2019/0147463 A1 * 5/2019 Karmakar .............. G06N 20/00
705/7.31
2019/0236531 A1 * 8/2019 Adato .................... G06V 20/64
(Continued)

FOREIGN PATENT DOCUMENTS

WO WO-2019032307 A1 * 2/2019 ......... G06K 9/00335

OTHER PUBLICATIONS

Hübner et al.,Retail category management: State-of-the-art review of quantitative research and software applications in assortment and shelf space management, Omega, vol. 40, Issue 2, 2012, pp. 199-209, (Year: 2012).*
(Continued)

*Primary Examiner* — Chesiree A Walton
(74) *Attorney, Agent, or Firm* — Spencer Fane LLP; Steven J. Laureanti

(57) ABSTRACT
A system and method are disclosed for virtual planogram automation comprising receiving, by a planogram planner comprising a server, image data from imaging devices of products prior to the display of the products in a product display area at a retail entity, detecting changes in a product based on the received image data, performing simulated annealing to generate new planogram options by generating a planogram option in response to received image data and one or more received KPI's, incrementing the planogram option according to neighboring states of the planogram parameters, calculating an objective function measuring optimality of the incremented planogram option, repeating the generating, incrementing and calculating steps until a stopping criterion is met according to the objective function, and determining a final planogram based on the stopping criterion being met.

20 Claims, 8 Drawing Sheets

Related U.S. Application Data filed on Jun. 25, 2021, provisional application No. 63/208,638, filed on Jun. 9, 2021.

(51) Int. Cl.
  *G06Q 10/087*      (2023.01)
  *G06V 20/00*       (2022.01)

(56)                References Cited

U.S. PATENT DOCUMENTS

2021/0350555 A1 *  11/2021  Fischetti  .................. G06T 7/73
2021/0374642 A1 *  12/2021  Bronicki  .......... G06Q 10/06395

OTHER PUBLICATIONS

Bin Li "Application of machine vision technology in geometric dimension measurement of small parts," Li EURASIP Journal on Image and Video Processing (2018) 2018:127.
Muthugnanambika M. et al., "An Automated Vision Based Change Detection Method for Planogram Compliance in Retail Stores," DOI:10.1007/978-3-319-71767-8_33, In book: Computational Vision and Bio Inspired Computing (pp. 399-411) 2018.

* cited by examiner

VIRTUAL PLANOGRAM AUTOMATION AND MODIFICATION

CROSS-REFERENCE TO RELATED APPLICATIONS

The present disclosure is related to that disclosed in the U.S. Provisional Application No. 63/214,965, filed Jun. 25, 2021, entitled "Virtual Planogram Automation and Modification," U.S. Provisional Application No. 63/220,740, filed Jul. 12, 2021, entitled "Virtual Planogram Automation and Modification with Historical Use Case Data and Scoring Algorithms," and U.S. Provisional Application No. 63/208,638, filed Jun. 9, 2021, entitled "Virtual Planogram Automation and Modification with Computer Vision." U.S. Provisional Application Nos. 63/214,965, 63/220,740, and 63/208,638 are assigned to the assignee of the present application. The present invention hereby claims priority under 35 U.S.C. § 119 (e) to U.S. Provisional Application Nos. 63/214,965, 63/220,740, and 63/208,638.

TECHNICAL FIELD

The present disclosure relates generally to planogram planning and execution and specifically to generating new planogram options in response to detected changes in planogram product dimensions.

BACKGROUND

Planogram planning includes one or more actions associated with creating, communicating, executing, and verifying a planogram. A planogram comprises a representation of the arrangement of products on a shelf or other retail displays which, for example, are sent from a retail headquarters to be implemented at one or more retail stores and/or in one or more supply chains. Typically, a planogram may be generated relatively infrequently (e.g., twice a year) as the generation of a planogram requires significant time and human supervision. However, unexpected changes to the dimensions of product packaging may result in a planogram that is unusable as designed, and typically planograms are inflexible and not easily modifiable in response to planned or unplanned changes to product dimensions, meaning significant time and human effort may be required on short notice to correct unworkable planograms. These issues with existing planogram generation may result in delays in product availability, lost sales and significant costs in time and man hours, all of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
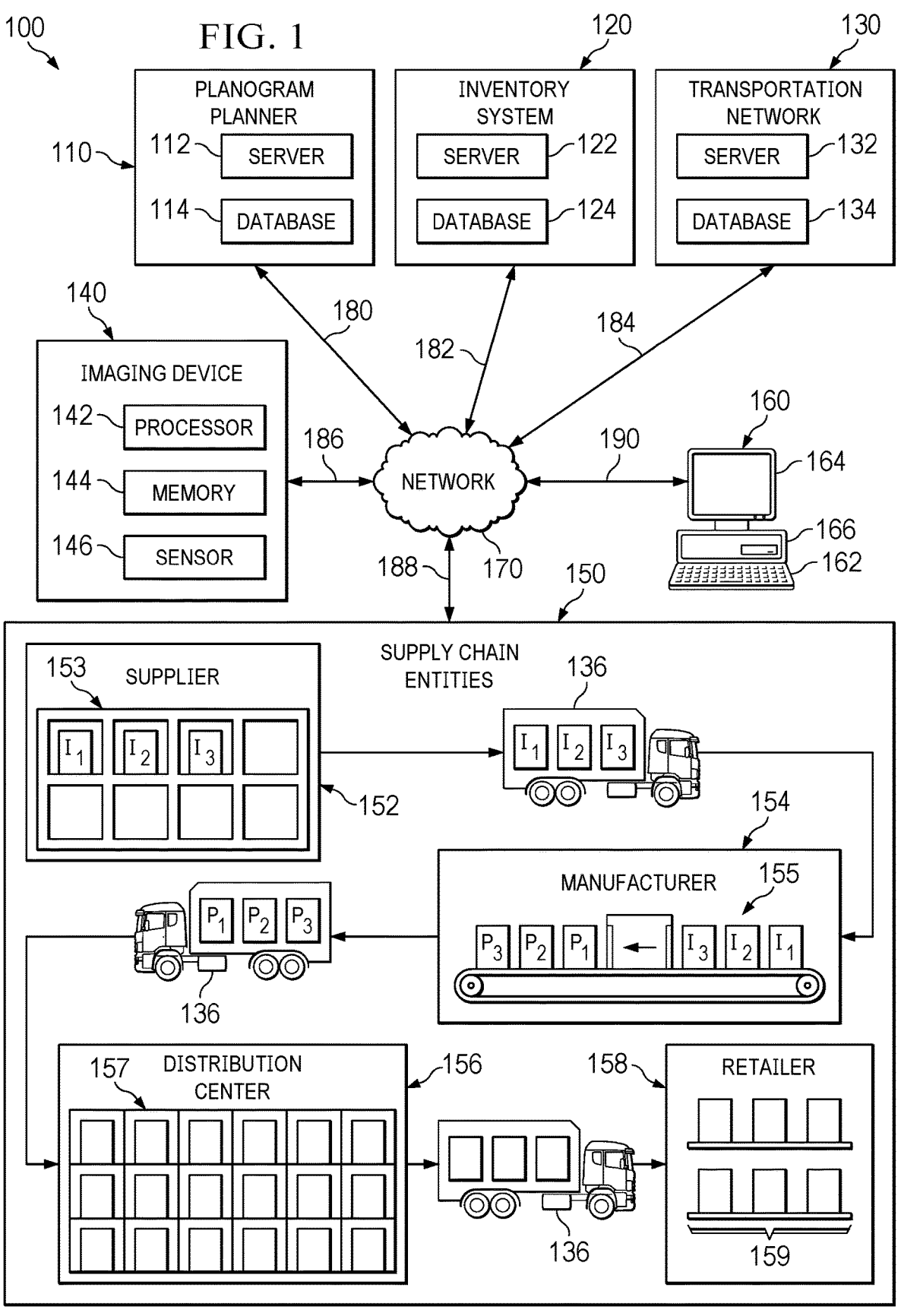
FIG. 1 illustrates a supply chain network, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide an automated planogram generation system and method to generate and modify one or more planogram options for supply chain entities in a supply chain network in response to changes detected to planogram product packaging dimensions. Embodiments utilize a planogram planner that scans products, detects changes in product dimensions using computer vision, and automatically generates and simulates one or more new planogram options to maximize profitability, product placements, and/or other key performance indicators (KPIs) in view of the detected product dimension changes. Embodiments permit one or more users to manually alter the generated new planogram options before transmitting the planogram options for approval by key supply chain stakeholders.

Embodiments automatically detect changes to product dimensions and generate new planogram options in response, with minimal human involvement, to adapt to ongoing product packaging dimensions and data. Embodiments enable planograms associated with particular business attributes allowing those without data science expertise to select from different generated planogram options. Embodiments enable retail planners to adapt to changing market conditions quickly and efficiently, and to implement agile data-driven planograms automatically calibrated to take into account product packaging changes.

FIG. 1 illustrates supply chain network 100, according to a first embodiment. Supply chain network 100 comprises planogram planner 110, inventory system 120, transportation network 130, one or more imaging devices 140, one or more supply chain entities 150, one or more computers 160, network 170, and one or more communication links 180-190. Although a single supply chain planner 110, a single inventory system 120, a single transportation network 130, one or more imaging devices 140, one or more supply chain entities 150, one or more computers 160, a single network 170, and one or more communication links 180-190 are shown and described, embodiments contemplate any number of supply chain planners 110, inventory systems 120, transportation networks 130, imaging devices 140, supply chain entities 150, computers 160, networks 170, and communication links 180-190, according to particular needs.

In one embodiment, planogram planner 110 comprises server 112 and database 114. As described in more detail below, planogram planner 110 comprises one or more modules to, for example, detect product packaging changes using computer vision and respond to the product packaging changes by generating one or more new planogram options.

Inventory system 120 comprises server 122 and database 124. Server 122 of inventory system 120 is configured to receive and transmit inventory data, including item identifiers, pricing data, attribute data, inventory levels, and other like data about one or more items or products at one or more locations in supply chain network 100. Server 122 stores and retrieves inventory data from database 124 or from one or more locations in supply chain network 100.

According to embodiments, database 124 includes current or projected inventory quantities or states, order rules, or explanatory variables. For example, database 124 may comprise the current level of inventory for each item at one or more stocking points across supply chain network 100. In addition, database 124 may comprise order rules that describe one or more rules or limits on setting an inventory policy, including, but not limited to, a minimum order quantity, a maximum order quantity, a discount, and a step-size order quantity, and batch quantity rules. According to some embodiments, database 124 may comprise explanatory variables that describe the data relating to specific past, current, or future indicators and the data of promotions, seasonality, special events (such as sporting events), weather, and the like. According to some embodiments, planogram planner 110 accesses and stores inventory data in database 124, which may be used by planogram planner 110 to generate one or more planograms, set inventory levels at one or more stocking points, initiate manufacturing of one or more components, or the like. In addition, or as an alternative, the inventory data of database 124 may be updated by receiving current item quantities, mappings, or locations from inventory system 120, transportation network 130, and/or one or more supply chain entities 150.

Transportation network 130 comprises server 132 and database 134. According to embodiments, transportation network 130 directs one or more transportation vehicles 136 to ship one or more items between one or more supply chain entities 150, based, at least in part, on the planograms and instruction sets generated by planogram planner 110. Transportation vehicles 136 comprise, for example, any number of trucks, cars, vans, boats, airplanes, unmanned aerial vehicles (UAVs), cranes, robotic machinery, or the like. Transportation vehicles 136 may comprise radio, satellite, or other communication systems that communicates location information (such as, for example, geographic coordinates, distance from a location, global positioning satellite (GPS) information, or the like) with planogram planner 110, inventory system 120, transportation network 130, and/or one or more supply chain entities 150 to identify the location of transportation vehicle 136 and the location of any inventory or shipment located on transportation vehicle 136. In addition to the supply chain models, the number of items shipped by transportation vehicles 136 in transportation network 130 may also be based, at least in part, on the number of items currently in stock at one or more supply chain entities 150, the number of items currently in transit in transportation network 130, a forecasted demand, a supply chain disruption, and the like.

According to embodiments, one or more imaging devices 140 comprise a mobile handheld device such as, for example, a smartphone, a tablet computer, a wireless device, a networked electronic device, and the like. One or more imaging devices 140 may be configured to transmit item identifiers to one or more databases local to, or remote from, supply chain network 100 in response to scanning one or items by one or more sensors 146. This may include, for example, a stationary scanner that scans and identifies nearby items within transportation network 130 (such as, for example, on one or more transportation vehicles 136), one or more suppliers 152, one or more manufacturers 154, one or more distribution centers 156, or one or more retailers 158. One or more sensors 146 of one or more imaging devices 140 may comprise an imaging sensor, such as, for example, a camera, scanner, electronic eye, photodiode, charged coupled device (CCD), barcode scanner, or any other device that detects visual information (such as, for example, color, shape, size, fill level, or the like). One or more imaging devices 140 may comprise, for example, a mobile handheld electronic device such as, for example, a smartphone, a tablet computer, a wireless communication device, and/or one or more networked electronic devices configured to image items using one or more sensors 146 and transmit product images to one or more databases local to, or remote from, supply chain network 100.

In addition, or as an alternative, one or more sensors 146 may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or other like encodings of identifying information. One or more imaging devices 140 may generate a mapping of one or more items in supply chain network 100 by scanning an identifier or object associated with an item and identifying the item based, at least in part, on the scan.

Additionally, one or more sensors 146 of one or more imaging devices 140 may be located at one or more locations local to, or remote from, one or more imaging devices 140, including, for example, one or more sensors 146 integrated into one or more imaging devices 140 or one or more sensors 146 remotely located from, but communicatively coupled with, one or more imaging devices 140. According to some embodiments, one or more sensors 146 may be configured to communicate directly or indirectly with supply chain planner 110, inventory system 120, transportation network 130, one or more imaging devices 140, one or more supply chain entities 150, one or more computers 160, and/or network 170 using one or more communication links 180-190.

As shown in FIG. 1, supply chain network 100 operates on one or more computers 160 that are integral to or separate from the hardware and/or software that support planogram planner, inventory system 120, transportation network 130, one or more imaging devices 140, and one or more supply chain entities 150. Supply chain network 100 comprising planogram planner 110, inventory system 120, transportation network 130, one or more imaging devices 140, and one or more supply chain entities 150 may operate on one or more computers 160 that are integral to or separate from the hardware and/or software that support planogram planner 110, inventory system 120, transportation network 130, one or more imaging devices 140, and one or more supply chain entities 150. One or more computers 160 may include any suitable input device 162, such as a keypad, mouse, touch screen, microphone, or other device to input information. One or more computers 160 may also include any suitable output device 164, such as, for example, a computer monitor, that may convey information associated with the operation of supply chain network 100, including digital or analog data, visual information, or audio information. Computer 160 may include fixed or removable computer-readable storage media, including a non-transitory computer readable medium, magnetic computer disks, flash drives, CD-ROM, in-memory device or other suitable media to receive output from and provide input to supply chain network 100.

Computer 160 may include one or more processors 166 and associated memory to execute instructions and manipulate information according to the operation of supply chain network 100 and any of the methods described herein. One or more processors 166 may execute an operating system program stored in memory to control the overall operation of computer 160. For example, one or more processors 166 control the reception and transmission of signals within the system. One or more processors 166 execute other processes and programs resident in memory, such as, for example, registration, identification or communication and moves data into or out of the memory, as required by an executing process. In addition, or as an alternative, embodiments contemplate executing the instructions on computer 160 that cause computer 160 to perform functions of the method. Further examples may also include articles of manufacture including tangible computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from planogram planner, inventory system 120, transportation network 130, one or more imaging devices 140, and one or more supply chain entities 150. In addition, each of one or more computers 160 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with planogram planner 110, inventory system 120, transportation network 130, one or more imaging devices 140, and one or more supply chain entities 150.

These one or more users may include, for example, a "manager" or a "planner" handling generation of planograms and instruction sets, managing the inventory of items, imaging items, managing storage and shipment of items, and/or one or more related tasks within supply chain network 100. In addition, or as an alternative, these one or more users within supply chain network 100 may include, for example, one or more computers 160 programmed to autonomously handle, among other things, planogram planning, shelving resets, task management, communication and assignment of planograms and instructions, issue identification and resolution, controlling manufacturing equipment, and adjusting various levels of manufacturing and inventory levels at various stocking points and distribution centers 156, and/or one or more related tasks within supply chain network 100.

One or more supply chain entities 150 represent one or more supply chain networks, including one or more enterprises, such as, for example networks of one or more suppliers 152, manufacturers 154, distribution centers 156, retailers 158 (including brick and mortar and online stores), customers, and/or the like. Each of one or more supply chain entities 150 may comprise one or more cameras, depths sensors, infrared imaging devices, and/or other data-gathering components to capture images, depth data, and/or other data regarding one or more products and product dimensions delivered to each supply chain entity 150. Suppliers 152 may be any suitable entity that offers to sell or otherwise provides one or more items (i.e., materials, components, or products) to one or more manufacturers. Suppliers 152 may comprise automated distribution systems 153 that automatically transport products to one or more manufacturers 154 based, at least in part, on planograms and instruction sets determined by planogram planner and/or one or more other factors described herein.

Manufacturers 154 may be any suitable entity that manufactures at least one product. Manufacturers 154 may use one or more items during the manufacturing process to produce any manufactured, fabricated, assembled, or otherwise processed item, material, component, good, or product. In one embodiment, a product represents an item ready to be supplied to, for example, one or more supply chain entities 150 in supply chain network 100, such as retailers 158, an item that needs further processing, or any other item. Manufacturers 154 may, for example, produce and sell a product to suppliers 152, other manufacturers 154, distribution centers 156, retailers 158, a customer, or any other suitable person or entity. Manufacturers 154 may comprise automated robotic production machinery 155 that produce products based, at least in part, on planograms and instruction sets determined by planogram planner and/or one or more other factors described herein.

Distribution centers 156 may be any suitable entity that offers to store or otherwise distribute at least one product to one or more retailers 158 and/or customers. Distribution centers 156 may, for example, receive a product from a first one or more supply chain entities 150 in supply chain network 100 and store and transport the product for a second one or more supply chain entities 150. Distribution centers 156 may comprise automated warehousing systems 157 that automatically remove products from and place products into inventory based, at least in part, on one or more planograms generated by planogram planner 110.

Retailers 158 may be any suitable entity that obtains one or more products to sell to one or more customers. Retailers 158 may (like the other one or more supply chain entities 150) comprise a corporate structure having a retail headquarters and one or more retail stores. Retail headquarters comprises a central planning office with oversight of one or more retail stores. Retailer 158 stores may comprise any online or brick-and-mortar store, including stores with shelving systems. The one or more retail stores may sell products according to rules, strategies, orders, and/or guidelines developed by one or more retail headquarters. For example, retail headquarters may create planograms that determine how the store will shelve or display one or more products. Although planogram execution may be performed by a retail employee, embodiments contemplate automated configuration of shelving and retail displays. This may include, for example, automated robotic shelving machinery 159 that places products on shelves or automated shelving that automatically adjusts based, at least in part, on the planograms. The shelving systems may comprise, for example, various racks, fixtures, brackets, notches, grooves, slots, or other attachment devices for fixing shelves in various configurations. These configurations may comprise shelving with adjustable lengths, heights, and other arrangements.

Although one or more supply chain entities 150 are illustrated and described as separate and distinct entities, the same entity 150 may simultaneously act as any one of the one or more supply chain entities 150. For example, one or more supply chain entities 150 acting as manufacturer 154 can produce a product, and the same one or more supply chain entities 150 can act as supplier 152 to supply an item to itself or another one or more supply chain entities 150. Although one example of supply chain network 100 is illustrated and described in FIG. 1, embodiments contemplate any configuration of supply chain network 100, without departing from the scope described herein.

In one embodiment, each of planogram planner 110, inventory system 120, transportation network 130, one or more imaging devices 140, computer 160, and supply chain entities 150 may be coupled with network 170 using communications links 180-190, which may be any wireline, wireless, or other link suitable to support data communications between planogram planner 110, inventory system 120, transportation network 130, one or more imaging devices 140, computer 160, and supply chain entities 150 and network 170 during operation of supply chain network 100. Although communication links 180-190 are shown as generally coupling planogram planner 110, inventory system 120, transportation network 130, one or more imaging devices 140, one or more supply chain entities 150, and computer 160 to network 170, any of planogram planner 110, inventory system 120, transportation network 130, one or more imaging devices 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling planogram planner, inventory system 120, transportation network 130, one or more imaging devices 140, one or more supply chain entities 150, and computer 160. For example, data may be maintained locally to, or externally of planogram planner 110, inventory system 120, transportation network 130, one or more imaging devices 140, one or more supply chain entities 150, and computer 160 and made available to one or more associated users of planogram planner 110, inventory system 120, transportation network 130, one or more imaging devices 140, one or more supply chain entities 150, and computer 160 using network 170 or in any other appropriate manner. For example, data may be maintained in a cloud database at one or more locations external to planogram planner 110, inventory system 120, transportation network 130, one or more imaging devices 140, one or more supply chain entities 150, and computer 160 and made available to one or more associated users of planogram planner 110, inventory system 120, transportation network 130, one or more imaging devices 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, planogram planner 110 may generate planograms and instruction sets for the inventory of one or more supply chain entities 150 in supply chain network 100. Furthermore, planogram planner 110, inventory system 120, and/or transportation network 130 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, the configuration and quantity of packaging and shipping of products, and the display of products at one or more retail locations based on one or more planograms and instruction sets, generated plans and policies and/or current inventory or production levels. When the inventory of an item falls to a reorder point, planogram planner 110 may then automatically adjust product mix ratios, inventory levels, production of products of manufacturing equipment, and proportional or alternative sourcing of one or more supply chain entities until the inventory is resupplied to a target quantity.

For example, the methods described herein may include computers 160 receiving product data from automated machinery having at least one sensor and the product data corresponding to an item detected by the sensor of the automated machinery. The received product data may include an image of the item, an identifier, as described above, and/or other product data associated with the item (dimensions, texture, estimated weight, and any other like data). The method may further include computers 160 looking up the received product data in a database system associated with planogram planner 110, inventory system 120, and/or transportation network 130 to identify the item corresponding to the product data received from the automated machinery.

Computers 160 may also receive, from the automated machinery, a current location of the identified item. Based on the identification of the item, computers 160 may also identify (or alternatively generate) a first mapping in the database system, where the first mapping is associated with the current location of the item. Computers 160 may also identify a second mapping in the database system, where the second mapping is associated with a past location of the identified item. Computers 160 may also compare the first mapping and the second mapping to determine if the current location of the identified item in the first mapping is different than the past location of the identified item in the second mapping. Computers 160 may then send instructions to the automated machinery based, as least in part, on one or more differences between the first mapping and the second mapping such as, for example, to locate an item to add to or remove from a shelf or an inventory of or shipment for one or more supply chain entities 150. In addition, or as an alternative, planogram planner 110 monitors the supply chain constraints of one or more items at one or more supply chain entities 150 and adjusts the orders and/or inventory of the one or more supply chain entities 150 based on the supply chain constraints.

Figure 2:
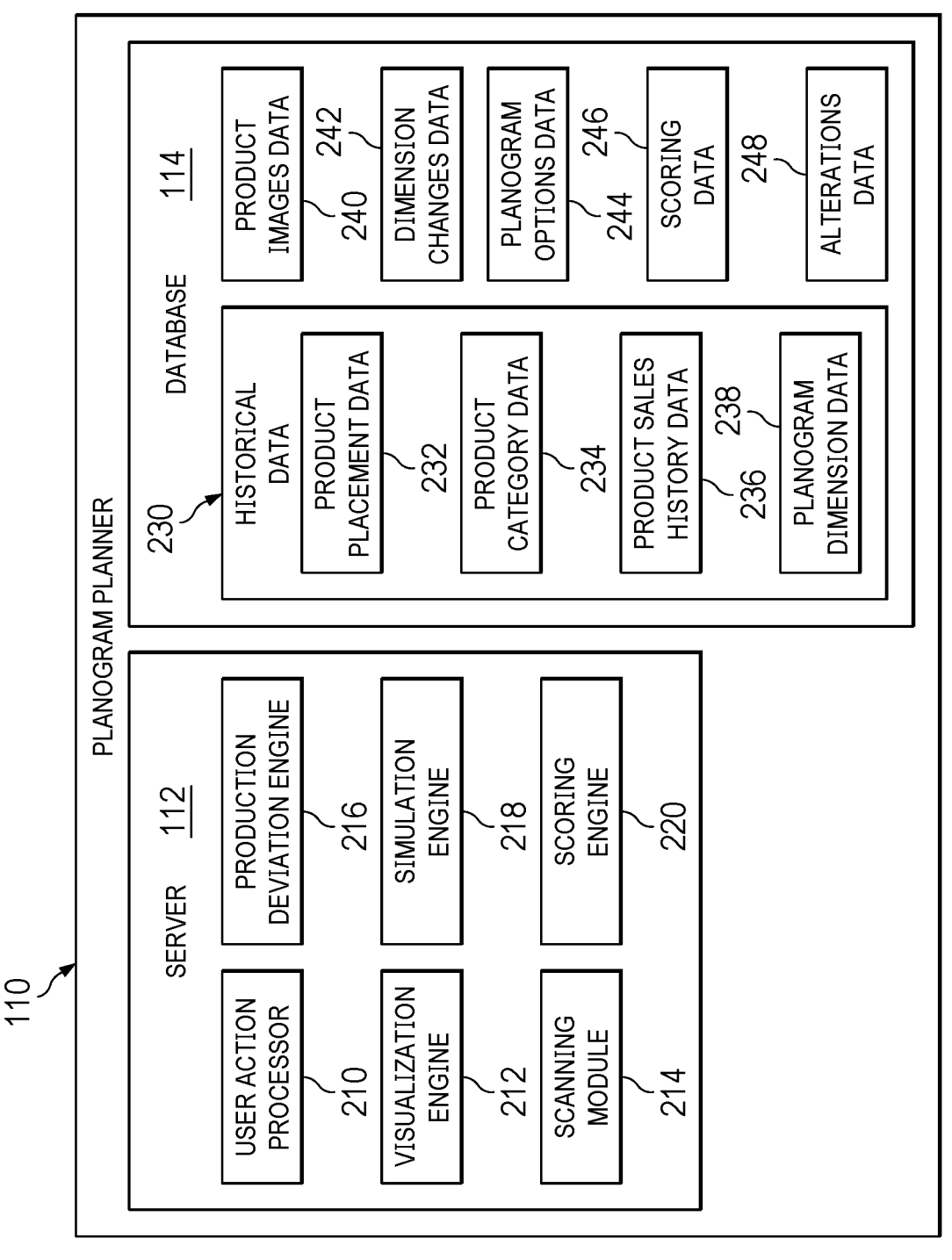
FIG. 2 illustrates the planogram planner of FIG. 1 in greater detail, in accordance with an embodiment.

FIG. 2 illustrates planogram planner 110 of FIG. 1 in greater detail in accordance with an embodiment. As discussed above, planogram planner 110 may comprise one or more computers at one or more locations including associated input devices, output devices, non-transitory computer-readable storage media, processors, memory, or other components for receiving, processing, storing, and communicating information according to the operation of supply chain network 100. Additionally, planogram planner 110 comprises server 112 and database 114. Although planogram planner 110 is shown as comprising a single server 112 and a single database 114, embodiments contemplate any suitable number of computers, servers, or databases internal to or externally coupled with planogram planner 110. According to some embodiments, planogram planner 110 may be located internal to one or more retailers 158 of one or more supply chain entities 150. In other embodiments, planogram planner 110 may be located external to one or more retailers 158 of one or more supply chain entities 150 and may be located in for example, a corporate retailer of the one or more retailers 158, according to particular needs.

Server 112 of planogram planner 110 may comprise user action processor 210, visualization engine 212, scanning module 214, product deviation engine 216, simulation engine 218, and scoring engine 220. Although server 112 is illustrated and described as comprising a single user action processor 210, visualization engine 212, scanning module 214, product deviation engine 216, simulation engine 218, and scoring engine 220, embodiments contemplate any suitable number or combination of these located at one or more locations, local to, or remote from planogram planner 110, such as on multiple servers or computers at any location in supply chain network 100.

As described in greater detail below, user action processor 210 receives and processes a user input, such as, for example, input received by input device 162 of one or more computers 160, including but not limited to a keyboard or mouse. One or more computers 160 may transmit input to planogram planner 110 using one or more communication links 180-190. User action processor 210 may register the input from one or more computers 160 and transmit the input to visualization engine 212 and/or other planogram planner modules, as described in greater detail below.

Visualization engine 212 generates one or more graphical user interface displays for display on one or more computer 160 monitors and/or other output devices 164. According to embodiments, visualization engine 212 may access database 114, including but not limited to historical data 230, product placement data 232, product category data 234, product sales history data 236, planogram dimension data 238, product images data 240, dimension changes data 242, planogram options data 244, scoring data 246, and/or alterations data 248, and may generate or more graphical user interface displays. The one or more graphical user interface displays may convey information, including product dimensions, sales data, KPI data, and/or any other type of information about supply chain network 100 and the ongoing sales of products sold throughout supply chain network 100. In an embodiment, visualization engine 212 may process input transmitted by user action processor 210, and, in response to the input, may generate one or more subsequent graphical user input displays that allow one or more computers 160 to interact with the graphical user interface displays and to review different information displayed by visualization engine 212, as illustrated in greater detail below.

Scanning module 214 may use one or more imaging devices 140, including but not limited to one or more cameras, one or more depth sensors, and/or one or more infrared imaging devices, to scan one or more products at one or more supply chain entities 150.

Product deviation engine 216 may use one or more computer vision techniques to classify product images and detect changes in product dimensions and/or other product deviations by comparing imaged product dimensions with one or more anticipated or defined product dimensions stored in planogram dimension data 238.

According to embodiments, simulation engine 218 generates one or more planogram options. Simulation engine 218 may access database 114, including but not limited to historical data 230, product placement data 232, product category data 234, product sales history data 236, planogram dimension data 238, and/or other data, and may generate one or more planogram options for specific product category and store combinations based on changes detected in product packaging. The planogram options may maximize one or more KPIs, including but not limited to maximizing the percentage of retail shelf space utilized at one or more store locations and/or responding to high product demand by stocking and displaying as many units of a particular product as possible at a particular location. In an embodiment, simulation engine 218 may utilize one or more machine learning and/or simulated annealing optimization processes to generate one or more planogram options.

Scoring engine 220 may score new planograms and/or planogram options according to one or more scoring mechanisms and/or scoring criteria, and/or may compare the new planograms and associated scores to one or more existing planograms and associated scores stored in planogram dimension data 238.

Database 114 may comprise one or more databases or other data storage arrangements at one or more locations, local to, or remote from, server 112. Database 114 comprises, for example, historical data 230, including product placement data 232, product category data 234, product sales history data 236, and planogram dimension data 238; product images data 240; dimension changes data 242; planogram options data 244; scoring data 246; and/or alterations data 248. Although database 114 is illustrated and described as comprising historical data 230, product placement data 232, product category data 234, product sales history data 236, planogram dimension data 238, product images data 240, dimension changes data 242, planogram options data 244, scoring data 246, and alterations data 248, embodiments contemplate any suitable number or combination of these, located at one or more locations, local to, or remote from, planogram planner 110 according to particular needs.

Historical data 230 comprises, for example, any data relating to past sales, past demand, purchase data, promotions, events, or the like of one or more products and/or one or more supply chain entities. Historical data 230 may be stored at time intervals such as, for example, by the minute, hour, daily, weekly, monthly, quarterly, yearly, or any suitable time interval, including substantially in real time.

Product placement data 232 may comprise product identifiers, item identifiers, attribute data (including, for example, brands, dimensions, product images, three-dimensional product representations, and the like), inventory levels, and other like data about one or more products, product hierarchies, substitutable products, target service levels, and the like. Product placement data 232 may comprise (X,Y) locations of each and every product in the planogram with reference to a left-bottom corner.

Product category data 234 may comprise category data for each of the products stored in product placement data 232. Product categories may organize products into any number of separate or overlapping categories. By way of example only and not by way of limitation, product category data 234 may comprise, for a series of drink products, alcoholic and non-alcoholic categories, beer, wine, and spirits categories, perishable and nonperishable categories, and/or any other categories applicable to the products. Although particular categories are described, embodiment contemplate any product categories, according to particular needs.

Product sales history data 236 comprises data relating to the sales effects each product may have when displayed next to other products on one or more shelves. Product sales history data 236 may comprise, for example, space elasticity data for a particular product and a particular retail location, and/or the increases or decreases a particular product may have on other products displayed next to the product on a retail shelf. According to embodiments, product sales history data 236 may comprise any one or more general cost or sales price components of one or more items in supply chain network 100, such as, for example, holding costs, batch costs, stockout costs, inventory costs, order costs, backorder costs, and backlog costs, and/or sale prices for one or more items. Although particular product sales history data 236 are described, embodiment contemplate any type of product sales history data 236, according to particular needs.

Planogram dimension data 238 may comprise data relating to one or more planograms. According to some embodiments, planograms comprise, among other data, three-dimensional capacity data of each shelf along with the fixture dimensions and cubic capacity of overall available space, and images of products arranged in a similar layout that the products will appear on the shelves of a retail store. According to other embodiments, planograms comprise one or more digital formats that represent products and product placement as sequences of data structures that may be more easily transmitted and modified by modules or components of one or more of planogram planner 110, one or more computers 160, and/or one or more retailers 158, businesses, or supply chain entities 150 in supply chain network 100. Planogram dimension data 238 may comprise one or more existing and/or currently-active planograms that are in place at the one or more retail locations 158. In an embodiment, planogram dimension data 238 may include relevant key performance indicators (KPIs) and metrics by which planogram planner 110 measures the performance of one or more products and/or one or more categories that have been displayed at one or more retail locations according to one or more planograms.

Product images data 240 may store one or more images, depth sensor data, and/or other data collected by one or more cameras, depth sensors, and/or other imaging devices 140. Product images data 240 may be collected and stored by scanning module 214 in order to receive up-to-date product images of, for example, new products within supply chain network 100 or products within supply chain network 100 with altered packaging.

Dimension changes data 242 may store one or more detected changes in product dimensions and/or other product deviations. Dimension changes data 242 may be determined by product deviation engine 216 using product images data 240.

Planogram options data 244 may store one or more planogram options generated by simulation engine 218. Simulation engine 218 may base planogram options data 244 on dimension changes data 242 representing changes to products within existing planograms.

Scoring data 246 may store one or more scores associated with the one or more planogram options. Scoring data 246 may be generated by scoring engine 220 by scoring the planogram options stored in planogram options data 244.

Alterations data 248 may store one or more alterations to one or more new planogram options. Alterations data 248 may be received by user action processor 210 in response to input received by one or more computers 160 in response to planogram options displayed by one or more computers 160 associated with planogram options data 244.

Figure 3:
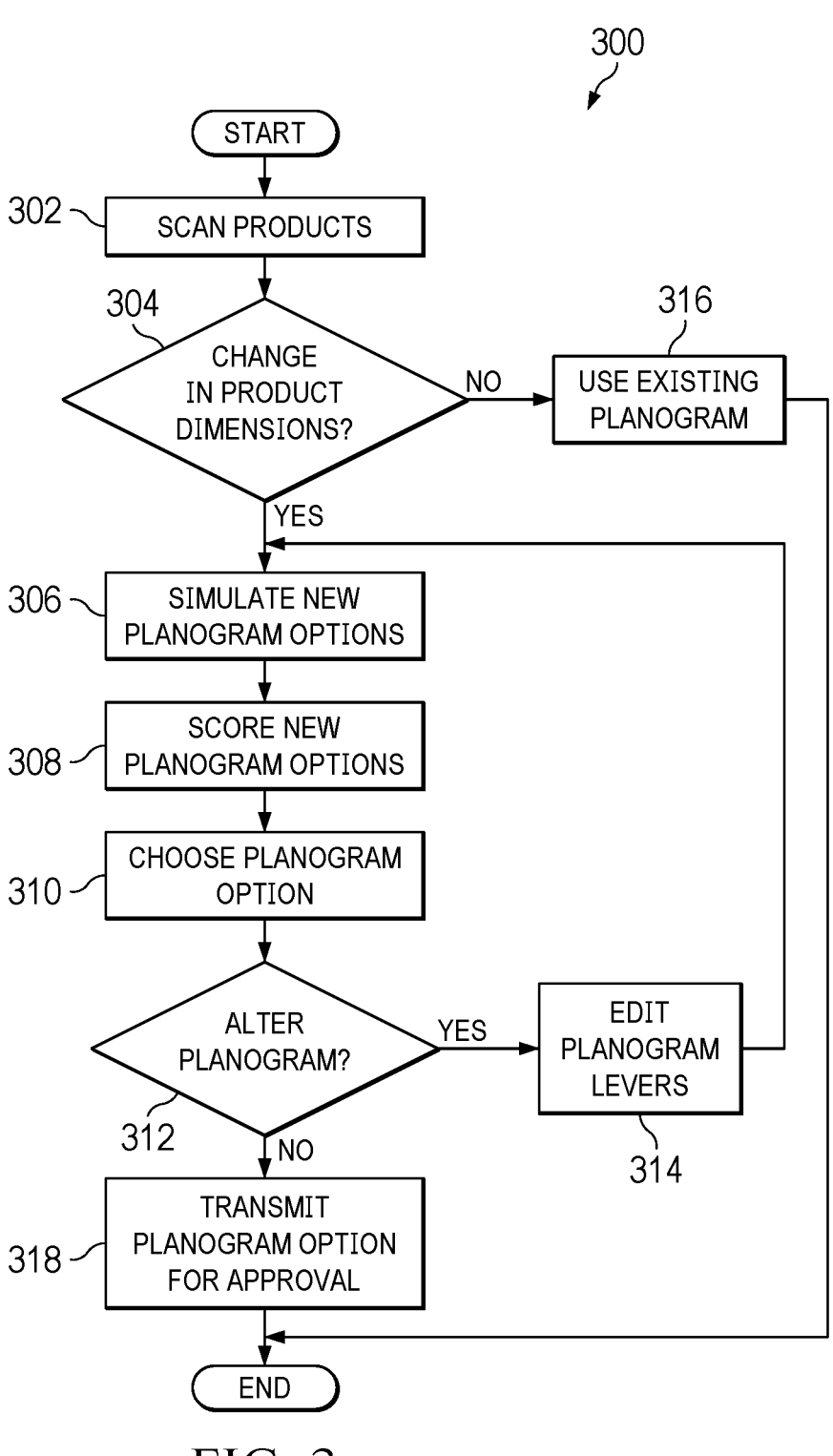
FIG. 3 illustrates an exemplary method to simulate new planogram options in response to detected changes in product dimensions, according to an embodiment.

FIG. 3 illustrates exemplary method 300 of planogram planner 110 simulating new planogram options in response to detected changes in product dimensions, according to an embodiment. Method 300 proceeds by one or more actions, which although described in a particular order may be performed in one or more permutations, combinations, orders, or repetitions, according to particular needs.

At first action 302, scanning module 214 uses one or more imaging devices 140, including but not limited to one or more cameras, one or more depth sensors, and/or one or more infrared imaging devices, to scan one or more products stored in or arriving at one or more supply chain entities 150. By way of example only and not by way of limitation, in an embodiment, scanning module 214 may use a camera located at retailer 158 to capture images of products delivered to retailer 158 from other locations in supply chain network 100. Scanning module 214 may store collected images, dimensional data, depth data, and/or other product data in product images data 240.

At second action 304, product deviation engine 216 determines whether one or more changes in product dimensions have occurred. In an embodiment, product deviation engine 216 accesses product images data 240 and detects one or more changes in one or more product dimensions, including but not limited to all three physical dimensions (X, Y, and Z axes). Product deviation engine 216 may use one or more computer vision techniques to classify product images, measure distance or volume, and detect changes in product dimensions and/or other product deviations by comparing imaged product dimensions with one or more anticipated or defined product dimensions stored in planogram dimension data 238 . . . . Visualization engine 212 may access dimension changes data 242 and may generate one or more affected product displays 510, see FIG. 5 below, illustrating the one or more products with detected dimension changes.

If product deviation engine 216 detects one or more changes in product dimensions, product deviation engine 216 stores the detected changes in dimension changes data 242 and planogram planner 110 moves to third action 306.

If, on the other hand, product deviation engine 216 does not detect one or more changes in product dimensions, planogram planner 110 moves to eight action 316. At eight action 316, planogram planner 110 uses the existing planogram stored in planogram dimension data 238 and terminates the actions of method 300.

At third action 306, simulation engine 218 simulates new planogram options by generating one or more new planograms in response to the product dimension changes detected by product deviation engine 216. In an embodiment, simulation engine 218 accesses the detected product dimension changes stored in dimension changes data 242, and compares the imaged product dimensions with one or more anticipated or defined product dimensions stored in planogram dimension data 238 in order to determine the total area remaining in the simulated planogram for alternative product placements after factoring in the detected product dimension changes.

For example, in an embodiment in which the existing planogram specifies four customer-facing slots for Product X at 100 square inches allocated per unit of Product X (thereby planning for 400 total customer-facing square inches for four units of Product X according to the existing planogram), product deviation engine 216 may determine that received units of Product X comprise only 80 square inches per unit instead of 100 square inches per unit. In this example, simulation engine 218 may determine that the allocated planogram space for 400 customer-facing square inches of Product X will in fact permit the allocation of five customer-facing slots for Product X (at the detected 80 square inches per unit), and simulation engine 218 may generate a new planogram specifying the placement of five customer-facing Product X units. In other embodiments, simulation engine 218 may generate new planograms making any changes to one or more existing planograms, including but not limited to replacing products with other products, increasing or decreasing the number of products displayed by the planogram, and/or altering the display location of one or more products with respect to one or more other products in order to maximize the number of products displayed, maximize the profitability of products displayed, and/or maximize or minimize one or more KPIs, according to particular needs.

Having generated one or more new planograms, simulation engine 218 stores the new planograms in planogram options data 244. Visualization engine 212 may access dimension changes data 242 and/or planogram options data 244, and may generate one or more affected planogram displays 610, see FIG. 6 below, illustrating the planograms that may be affected by the detected changes in product dimensions.

In an embodiment, simulation engine 218 may generate a new planogram designed to maximize or minimize any KPIs. Simulation engine 218 may apply one or more machine learning processes and/or one or more simulated annealing optimization processes, which may include one or more simulated annealing calculations, to approximate a new planogram based on one or more KPIs. By way of example only and not by way of limitation, simulation engine 218 may generate a new planogram using, in part, equation (1), which is an objective function for an optimization problem:

$$\sum_{i=1}^{n}\sum_{j=1}^{s} x_{ij}\gamma_j P_i(F_i)^{e_i} \qquad (1)$$

Wherein $x_{ij}$ is 1 if $P_i$ belongs to shelf j, $\gamma_j$ is the location effect of shelf j, $P_i$ is the sales figures of product i, $F_i$ is the number of facings of product i, and $e_i$ is the space elasticity of product i. Space elasticity is defined as the measurement of impact on a product's sales performance by increasing or decreasing its allocation of space within a fixture (such as, for example, increasing or decreasing space on a particular retail shelf). Simulation engine 218 may attempt to maximize the objective function to generate a planogram having the following constraints: (1) items allocated to each shelf should not exceed the capacity of the shelf, (2) items with the same SKU (similar products) should be displayed together, and (3) the minimum and maximum facings which can be allocated to each item should fall within the available space dimension limits of the database data. Although a particular objective function is illustrated and described as equation (1), embodiments contemplate simulation engine 218 using another objective function, or other constraints to generate new planograms, according to particular needs. In addition or as an alternative, simulation engine 218 may execute multiple iterations of the simulated annealing optimization process to generate a final planogram for the given constraints.

At fourth action 308, scoring engine 220 scores the new planogram options. Scoring engine 220 may access the one or more new planograms stored in planogram options data 244, and may score the new planograms according to one or more scoring mechanisms and/or scoring criteria, and/or may compare the new planograms and associated scores to one or more existing planograms and associated scores stored in planogram dimension data 238. Scoring engine 220 may store scores for the one or more new planograms in scoring data 246.

At fifth action 310, user action processor 210 and visualization engine 212 may choose one or more new planogram options. In an embodiment, visualization engine 212 accesses data stored in planogram planner 110 database, including but not limited to one or more new planograms stored in planogram options data 244 and scores for the one or more new planograms stored in scoring data 246. Visualization engine 212 may generate a generated planogram display 710, see FIG. 7 below, to illustrate new planogram options and associated details and scores. User action processor 210 may receive input from one or more computers 160, such as, for example, input to a computer mouse, keyboard, or touchscreen, and may transmit the input to visualization engine 212. In response to the transmitted input, visualization engine 212 may choose one or more new planogram options, may display a planogram option alteration display 810, see FIG. 8 below, and may proceed to sixth action 312.

At sixth action 312, user action processor 210 determines whether to alter the new planogram option. In an embodiment, planogram planner 110 may alter one or more variables and/or levers to change data associated with the one or more new planogram options. User action processor 210 may respond to input detected by one or more computers 160, and may alter one or more guiding principles associated with one or more new planogram options, including but not limited to rotating product facings, changing shelf heights, reducing product facings, modifying numbers of available shelves, and/or adding, removing, or modifying one or more products comprising the new planogram options.

If user action processor 210 does not detect input to one or more computers 160 specifying the alteration of the new planogram option, planogram planner 110 moves to ninth action 318, transmits the new planogram option to other locations in supply chain network 100 for final approval and implementation, and terminates the method.

If, on the other hand, user action processor 210 does detect input to one or more computers 160 specifying the alteration of the new planogram option, planogram planner 110 moves to seventh action 314.

At seventh action 314, user action processor 210 edits or alters one or more new planogram option levers and associated data. User action processor 210 may store the alterations to one or more new planogram option levers in alterations data 248. Planogram planner 110 may then move to third action 306, described above, and simulation engine 218 may generate new planogram options according to the constraints, limits, and/or other variables specified by alterations data 248. Planogram planner 110 may continue executing the actions of method 300 described above until user action processor 210, at sixth action 310, does not detect input to one or more computers 160 specifying the alteration of new planogram options, at which point planogram planner 110 moves to ninth action 318, transmits the new planogram option to other locations in supply chain network 100 for final approval and implementation, and terminates method 300.

To illustrate the operation of planogram planner 110 executing the actions of method 300 to detect product dimension changes and generate new planogram options in response, an example is now given. In the following example, planogram planner 110 detects toothpaste product dimension changes as toothpaste packaging reaches a retailer ("Retailer Y"), and generates new planogram options to accommodate the detected packaging dimension changes automatically. Although a particular example of detecting product dimension changes and generating new planogram options is provided herein, embodiments contemplate planogram planner 110 implementing actions 302-318 of method 300 in any order and with respect to any data, products, or categories, according to particular needs.

In this example, at first action 302, Retailer Y receives a shipment of toothpaste product packages intended to be placed on Retailer Y store shelves according to an existing planogram (the "Existing Planogram") stored in planogram planner 110 planogram dimension data 238. Scanning module 214 uses a plurality of cameras and depth sensors to scan the toothpaste products as they arrive at Retailer Y. Scanning module 214 stores the collected images and depth sensor data in product images data 240.

Figure 4:
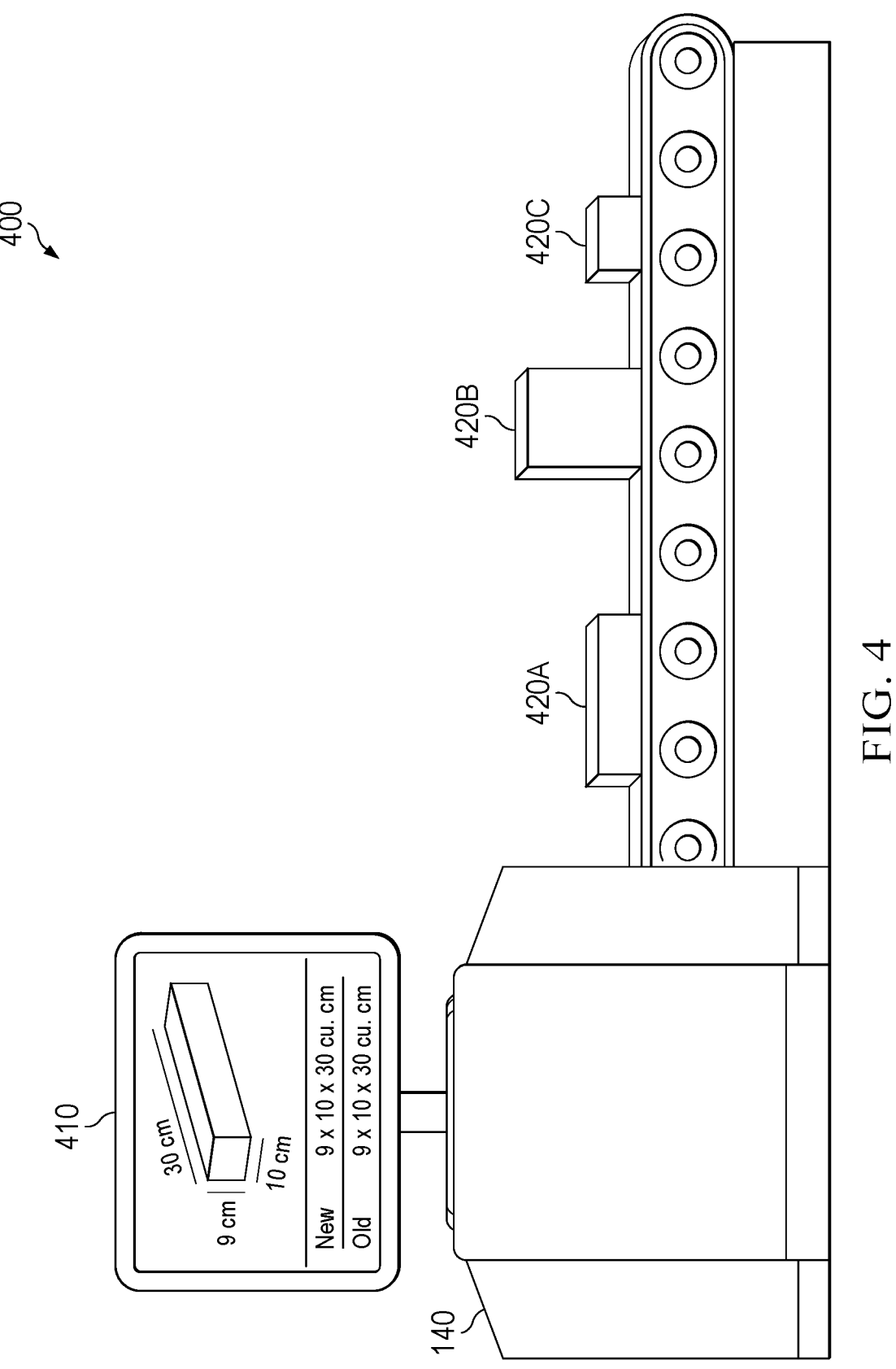
FIG. 4 illustrates an exemplary product scanning system, according to an embodiment.

FIG. 4 illustrates exemplary product scanning system 400, according to an embodiment. As illustrated by FIG. 4, Retailer Y scans and analyzes incoming retail product dimensions 410 as products 420A-420C are delivered to Retailer Y from other locations in supply chain network 100. Although FIG. 4 illustrates Retailer Y scanning and analyzing product dimensions 410 in a particular configuration using imaging device 140, embodiments contemplate scanning module 214 using any other image collection devices and/or any data collection devices to measure any product dimensions at any location in supply chain network 100, according to particular needs.

Continuing the example, at second action 304, product deviation engine 216 determines whether one or more changes in product dimensions have occurred. Product deviation engine 216 accesses product images data 240 and detects, in this example, multiple changes to multiple toothpaste product dimensions by using computer vision techniques to measure the size and dimensions of the toothpaste product packages arriving at Retailer Y. Product deviation engine 216 compares the measured size and dimensions of the toothpaste product packages to the expected toothpaste product package dimensions stored in the Existing Planogram, determines that dimension changes have occurred, and stores the detected dimension changes in dimension changes data 242. Visualization engine 212 accesses dimension changes data 242 and generates affected product display 510, illustrated by FIG. 5, illustrating the toothpaste products with detected dimension changes.

Figure 5:
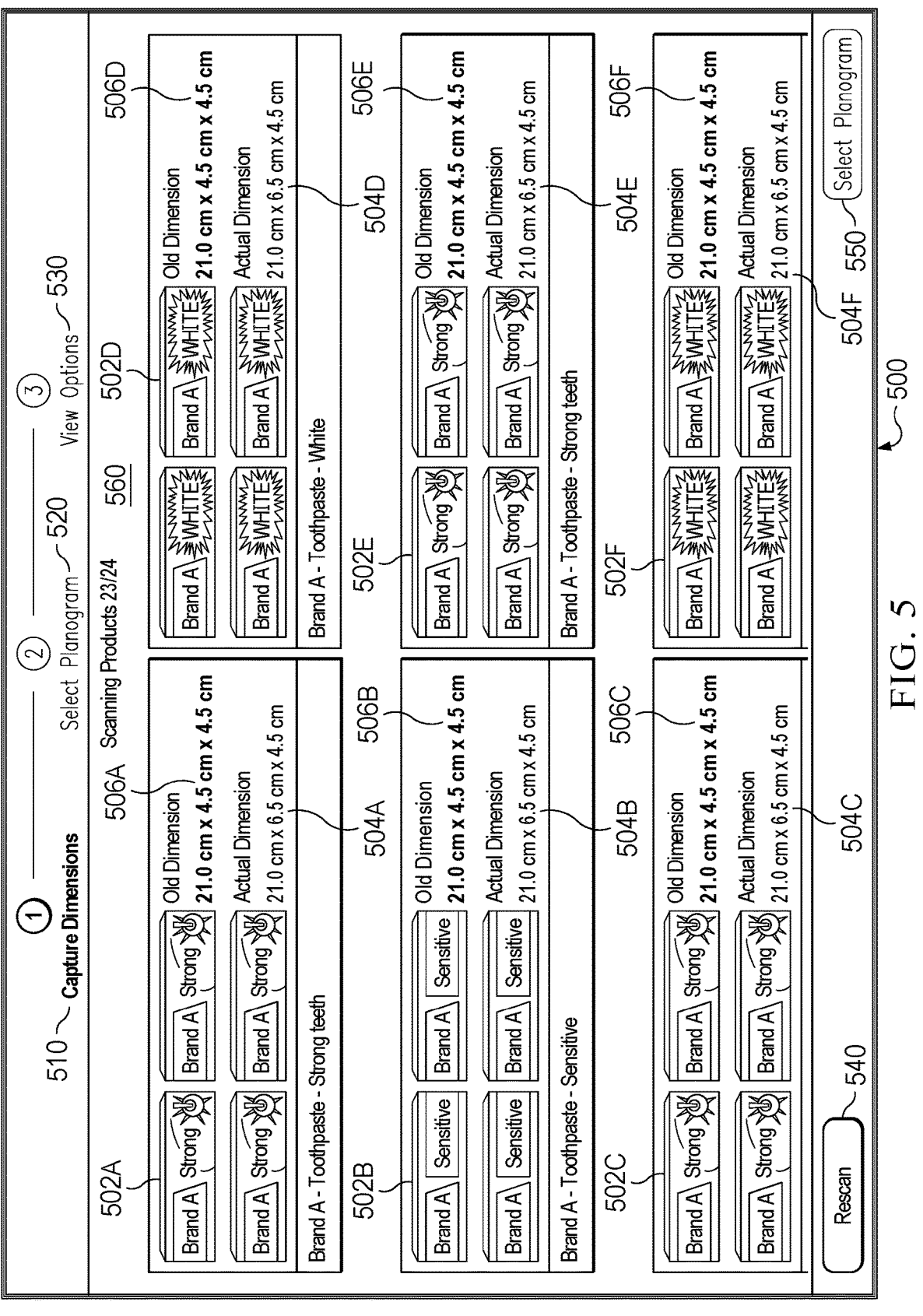
FIG. 5 illustrates a first graphical user interface, according to an embodiment.

FIG. 5 illustrates first GUI 500, according to an embodiment. First GUI 500 comprises Capture Dimensions indicator 510, Select Planogram indicator 520, View Options indicator 530, Rescan button 540 and Select Planogram button 550 and affected product display 560. Affected product display 560 comprises, in an embodiment, six toothpaste products 502A-502F in which actual toothpaste product dimensions 504A-504F detected by the product deviation engine (illustrated by "Actual Dimension" in FIG. 5) do not match allocated toothpaste product dimensions 506A-506F according to the Existing Planogram (illustrated by "Old Dimension" in FIG. 5). Although FIG. 5 illustrates affected product display 560 in a particular configuration, embodiments contemplate planogram planner 110 generating affected product displays 560 in any configuration and displaying any database data, according to particular needs.

Continuing the example, at third action 306, simulation engine 218 simulates new planogram options by generating new planograms in response to the toothpaste product dimension changes previously detected by product deviation engine 216. Simulation engine 218 accesses the detected toothpaste product dimension changes stored in dimension changes data 242, and compares the imaged product dimensions with the Existing Planogram stored in planogram dimension data 238 in order to determine the total area remaining in the simulated planogram for alternative product placements after factoring in the detected toothpaste product dimension changes. Simulation engine 218 generates, in this example, three new planograms, Planogram 1 720A, Planogram 2 720B, and Planogram 3 720C, (see FIG. 7, below) providing alternative product placement options that take into account the detected toothpaste product dimension changes. Having generated new planograms, simulation engine 218 stores new planograms 720A-720C in planogram options data 242. Visualization engine 212 accesses dimension changes data 242 and planogram options data 244, and generates affected planogram display 610, illustrated by FIG. 6, illustrating the planograms affected by the detected changes in toothpaste product dimensions.

Figure 6:
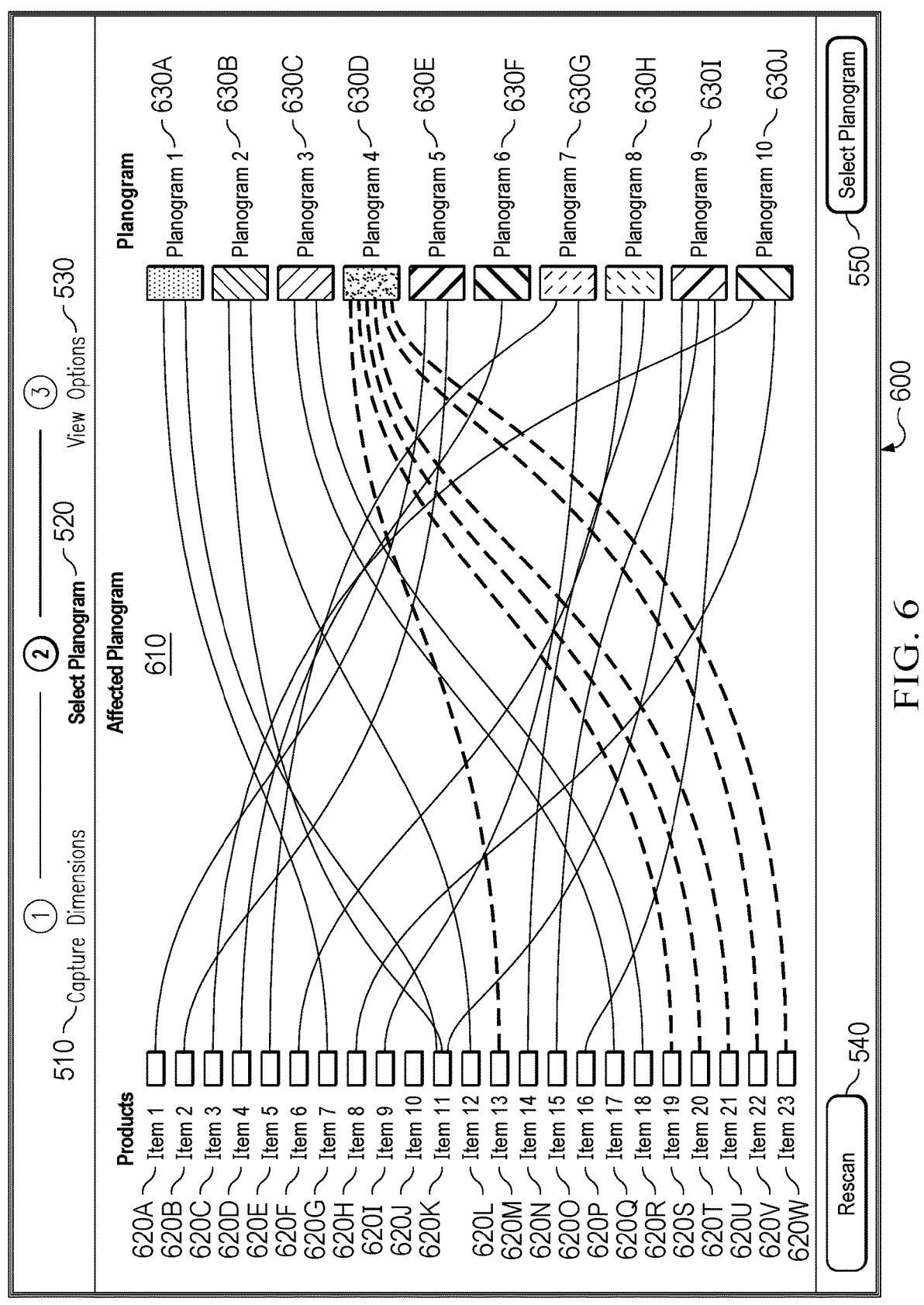
FIG. 6 illustrates a second graphical user interface, according to an embodiment.

FIG. 6 illustrates second GUI 600, according to an embodiment. Second GUI 600 comprises Capture Dimensions indicator 510, Select Planogram indicator 520, View Options indicator 530, Rescan button 540 and Select Planogram button 550 and affected planogram display 610. As illustrated by FIG. 6, affected planogram display 610 illustrates planograms 630A-630J (in the example illustrated by FIG. 6, Planogram 4 630D is highlighted, which is in this example the Existing Planogram) affected by the detected changes in toothpaste product dimensions 504A-504F (in the example illustrated by FIG. 6, item 13 620M, item 19 620S, item 20 620T, item 21 620U, item 22 620V and item 23 620W, are all be toothpaste items). Although FIG. 6 illustrates affected planogram display 610 in a particular configuration, embodiments contemplate planogram planner 110 generating affected planogram displays in any configuration and displaying any database data, according to particular needs. According to embodiments, user action processor 210 may respond to input detected by input device 162, and visualization engine 212 may visualize one or more changes in product dimensions and how the changes may affect multiple planograms, and/or may visualize one or more planograms and all products or items associated with the one or more planograms, according to particular needs.

Continuing the example, at fourth action 308, scoring engine 220 scores new planogram options 720A-720C. Scoring engine 220 accesses planograms 720A-720C stored in planogram options data 244, and scores new planograms 720A-720C according to a plurality of scoring mechanisms designed to maximize multiple KPIs, including in this example maximizing Retailer Y profitability and product shelf space occupied by the most profitable sales products. In this example, scoring engine 220 assigns a score of 88 to Planogram 1 720A, a score of 52 to Planogram 2 720B, and a score of 03 to Planogram 3 720C. Scoring engine 220 stores scores for each new planogram in scoring data 246.

Continuing the example, at fifth action 310, user action processor 210 and visualization engine 212 choose one or more new planogram options. In an embodiment, visualization engine 212 accesses data stored in database 114, including but not limited to new planograms 720A-720C stored in planogram options data 244 and scores for new planograms stored 720A-720C in scoring data 246. Visualization engine 212 generates generated planogram display 710, illustrated by FIG. 7, to illustrate the new planogram options and associated details and scores.

Figure 7:
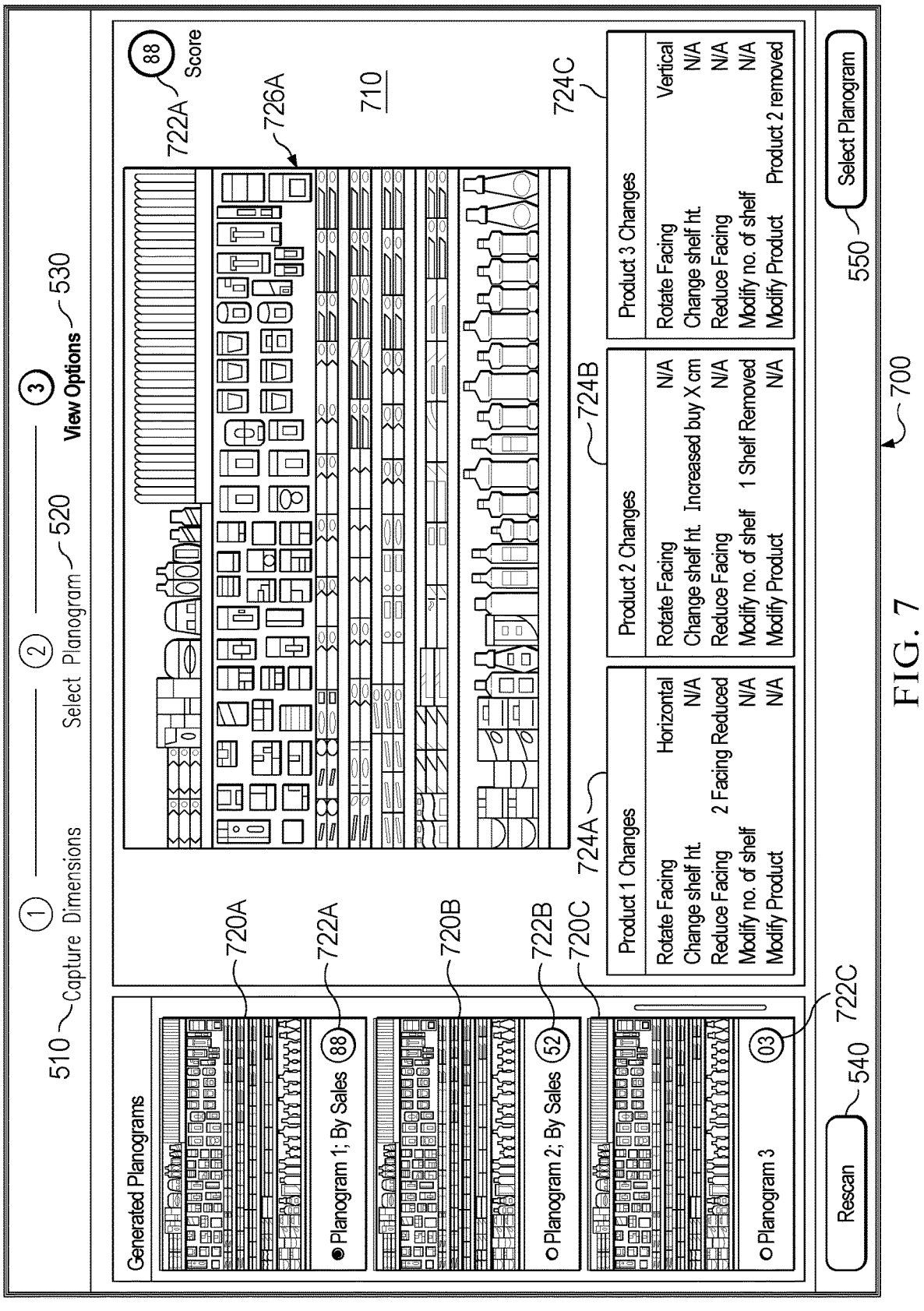
FIG. 7 illustrates a third graphical user interface, according to an embodiment.

FIG. 7 illustrates third GUI 700, according to an embodiment. Third GUI 700 comprises Capture Dimensions indicator 510, Select Planogram indicator 520, View Options indicator 530, Rescan button 540 and Select Planogram button 550 and generated planogram display 710. In the embodiment illustrated by FIG. 7, generated planogram display 710 lists each of the generated planograms, Planogram 1 720A, Planogram 2 720B, and Planogram 3 720C, including associated scores 722A-722C, product changes 724A-724C and planogram alteration details associated with each planogram 720, and visual representation 726A of planogram 720A. Although FIG. 7 illustrates generated planogram display 710 in a particular configuration, embodiments contemplate planogram planner 110 creating generated planogram displays 710 in any configuration and displaying any database data either visually or numerically, according to particular needs.

Continuing the example, user action processor 210 receives input from a computer mouse and transmits the input to visualization engine 212. In response to the transmitted input, visualization engine 212 selects Planogram 1 720A. Visualization engine generates 212 and displays planogram option alteration display 710, illustrated by FIG. 8, for Planogram 1 720A, and proceeds to sixth action 312.

Figure 8:
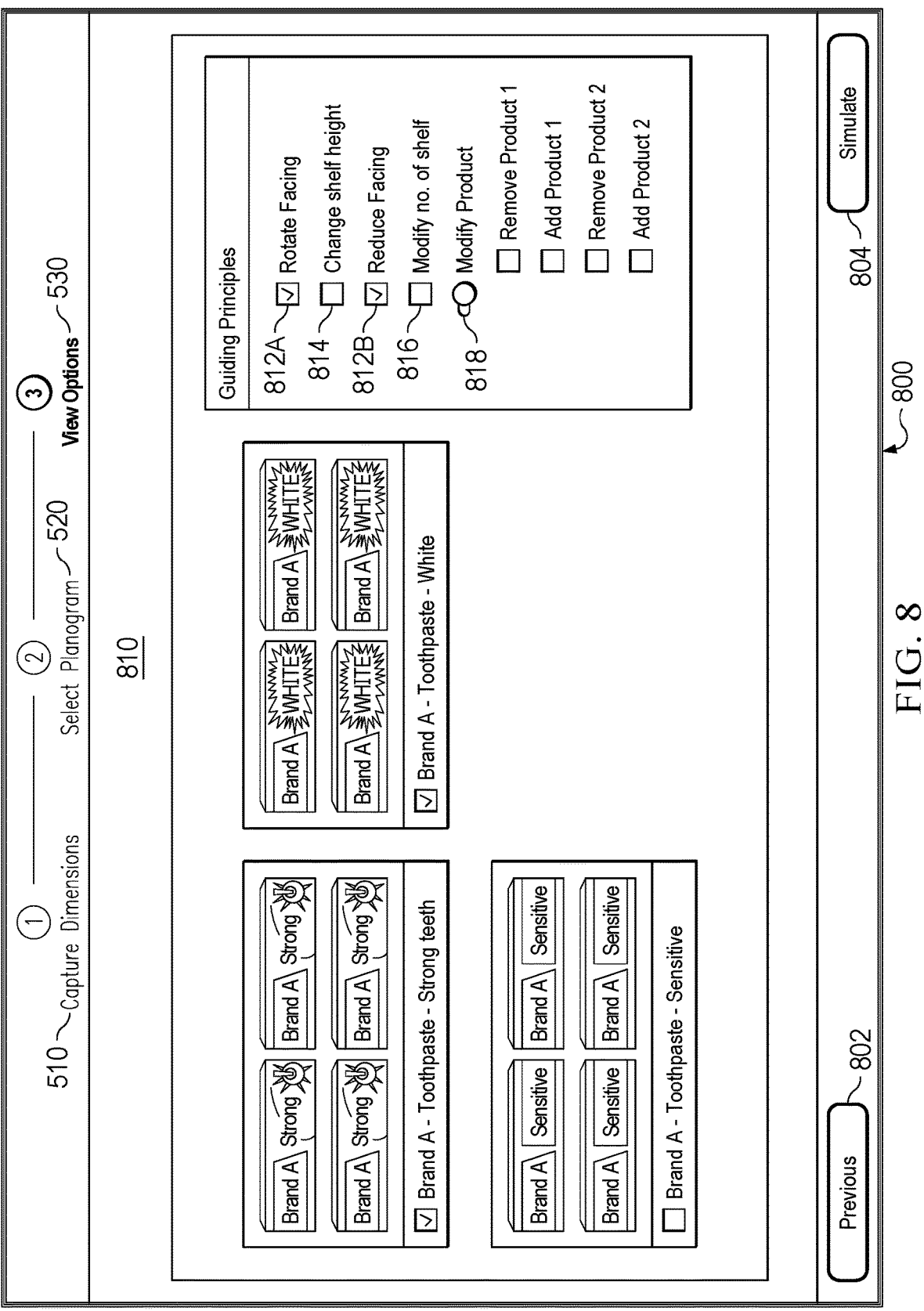
FIG. 8 illustrates a fourth graphical user interface, according to an embodiment.

FIG. 8 illustrates fourth GUI 800. Fourth GUI 700 comprises Capture Dimensions indicator 510, Select Planogram indicator 520, View Options indicator 530, Previous button 802, Simulate button 804 and planogram option alteration display 810. Planogram option alteration display 810, according to an embodiment. Planogram option alteration display 810 may provide one or more options by which manual intervention and alterations to one or more generated planograms may be implemented on the planogram. For example, in an embodiment, planogram option alteration display 810 may permit the alteration of one or more facings 812, shelf heights 814, number of shelves 816, and/or other product placement variables 818 for one or more generated planograms 720. Although FIG. 8 illustrates planogram option alteration display 810 in a particular configuration, embodiments contemplate planogram planner 110 creating generated planogram option alteration displays in any configuration and displaying any database data either visually or numerically, according to particular needs.

Continuing the example, at sixth action 312, user action processor 210 determines whether to alter Planogram 1 720A. In this example, user action processor 210 detects input to one or more computers 160 specifying the alteration of Planogram 1 720C, specifically by selecting the "Rotate Facing" and "Reduce Facing" options for two toothpaste products.

Concluding the example, at the ninth action of the method, the user action processor saves "Rotate Facing" option 812A and "Reduce Facing" option 812B for two toothpaste products in Planogram 1 720A in alterations data 248. Planogram planner 110 then returns to third action 306, described above, and simulation engine 218 generates new planogram options according to "Rotate Facing" option 812A and "Reduce Facing" option 812B for the two toothpaste products. Planogram planner 110 continues executing the actions of method 300 described above until user action processor 210, at sixth action 312, does not detect input to one or more computers 160 specifying the alteration of new planogram options, at which point planogram planner 110 moves to ninth action 318, transmits the new planogram options to other locations in supply chain network 100 for final approval and implementation, and terminates method 300.

Embodiments may also provide for a proactive, rather than reactive approach to generating planograms. In the embodiments described above, planogram planner 110 reacts to changes in product dimensions, relative to expected product dimensions, to automatically generate new planograms accounting for the changes in product dimensions. However, planogram planner 110 may also learn from previously generated planograms in order to generate additional planograms to account for problems with previous planograms. Assume, for example, that when attempting to implement a first planogram including a products from a particular supplier 158 planogram planner 110 determines that the products from particular supplier 158 are all oversized relative to the expected dimensions by 2%. If so, planogram planner 110 may, when generating a later planogram including products from particular supplier 158, may leave room in the planogram to account for an extra 2% of space, based on the past history of products from particular supplier 158 being 2% larger than expected. Thus, planogram planner 110 may proactively generate planograms that are more flexible than typical planograms.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been illustrated and described, it will be understood that various changes and modifications to the foregoing embodiments may become apparent to those skilled in the art without departing from the spirit and scope of the present invention.

What is claimed is:

1. A system, comprising:

a retail entity comprising a product display area;

a planogram planner comprising a server and configured to:

receive image data of one or more products prior to the display of the one or more products in the product display area, wherein the image data is received from one or more cameras associated with one or more imaging devices;

detect one or more changes in a product based on the received image data, wherein the one or more detected changes comprise one or more changes in one or more product dimensions;

perform simulated annealing to generate one or more new planogram options by:

generate a planogram option in response to received image data and one or more received KPI's;

increment the planogram option according to neighboring states of the planogram parameters;

calculate an objective function measuring optimality of the incremented planogram option;

repeat the generate, increment and calculate steps until a stopping criterion is met according to the objective function; and determine a final planogram based on the stopping criterion being met; and

automated robotic shelving machinery configured to:
  adjust the one or more products based on the final planogram.

2. The system of claim 1, wherein the planogram planner uses one or more depth sensors to scan the one or more products prior to the display of the one or more products in the product display area.

3. The system of claim 1, wherein the planogram parameters comprise:
  shelf identification, location effect of a shelf, sales figures of a particular product, number of product facings or space elasticity of a product.

4. The system of claim 1, wherein the simulated annealing is performed according to one or more constraints comprising:
  shelf capacity, similar products being displayed together, minimum product facings and maximum product facings.

5. The system of claim 1, wherein the one of more imaging devices further comprise:
  one or more depth sensors or one or more infrared imaging devices.

6. The system of claim 1, wherein the detected one or more changes in a product are determined based on comparing imaged product dimensions with corresponding product dimensions according to an existing planogram.

7. The system of claim 1, further comprising displaying a rendering of the final planogram.

8. A computer-implemented method, comprising:
  receiving, by a planogram planner comprising a server, image data of one or more products prior to the display of the one or more products in a product display area at a retail entity, wherein the image data is received from one or more cameras associated with one or more imaging devices;
  detecting, by the planogram planner, one or more changes in a product based on the received image data, wherein the one or more detected changes comprise one or more changes in one or more product dimensions;
  performing, by the planogram planner, simulated annealing to generate one or more new planogram options by:
    generating a planogram option in response to received image data and one or more received KPI's;
    incrementing the planogram option according to neighboring states of the planogram parameters;
    calculating an objective function measuring optimality of the incremented planogram option;
    repeating the generating, incrementing and calculating steps until a stopping criterion is met according to the objective function; and
    determining, by the planogram planner, a final planogram based on the stopping criterion being met; and
  adjusting, by automated robotic shelving machinery, the one or more products based on the final planogram.

9. The computer-implemented method of claim 8, further comprising scanning, using one or more depth sensors, the one or more products prior to the display of the one or more products in the product display area.

10. The computer-implemented method of claim 8, wherein the planogram parameters comprise:
  shelf identification, location effect of a shelf, sales figures of a particular product, number of product facings or space elasticity of a product.

11. The computer-implemented method of claim 8, further comprising performing, by the planogram planner, the simulated annealing according to one or more constraints comprising:

shelf capacity, similar products being displayed together, minimum product facings and maximum product facings.

12. The computer-implemented method of claim 8, wherein the one of more imaging devices further comprise:
  one or more depth sensors or one or more infrared imaging devices.

13. The computer-implemented method of claim 8, wherein the detected one or more changes in a product are determined based on comparing imaged product dimensions with corresponding product dimensions according to an existing planogram.

14. The computer-implemented method of claim 8, further comprising displaying, by the planogram planner, a rendering of the final planogram.

15. A non-transitory computer-readable storage medium embodied with software, the software when executed configured to:
  receive, by a planogram planner comprising a server, image data of one or more products prior to the display of the one or more products in a product display area at a retail entity, wherein the image data is received from one or more cameras associated with one or more imaging devices;
  detect one or more changes in a product based on the received image data, wherein the one or more detected changes comprise one or more changes in one or more product dimensions;
  perform simulated annealing to generate one or more new planogram options by:
    generate a planogram option in response to received image data and one or more received KPI's;
    increment the planogram option according to neighboring states of the planogram parameters;
    calculate an objective function measuring optimality of the incremented planogram option;
    repeat the generate, increment and calculate steps until a stopping criterion is met according to the objective function; and
    determine a final planogram based on the stopping criterion being met; and
  adjust, by automated robotic shelving machinery, the one or more products based on the final planogram.

16. The non-transitory computer-readable storage medium of claim 15, wherein the software when executed is further configured to scan, using one or more depth sensors, the one or more products prior to the display of the one or more products in the product display area.

17. The non-transitory computer-readable storage medium of claim 15, wherein the planogram parameters comprise:
  shelf identification, location effect of a shelf, sales figures of a particular product, number of product facings or space elasticity of a product.

18. The non-transitory computer-readable storage medium of claim 15, wherein the software when executed is further configured to perform the simulated annealing according to one or more constraints comprising:
  shelf capacity, similar products being displayed together, minimum product facings and maximum product facings.

19. The non-transitory computer-readable storage medium of claim 15, wherein the one of more imaging devices further comprise:
  one or more depth sensors or one or more infrared imaging devices.

20. The non-transitory computer-readable storage medium of claim 15, wherein the software when executed is further configured to determine the detected one or more changes in a product based on comparing imaged product dimensions with corresponding product dimensions according to an existing planogram.

\* \* \* \* \*